(12) United States Patent
Cho

(10) Patent No.: US 9,774,781 B2
(45) Date of Patent: Sep. 26, 2017

(54) LOCAL TONE MAPPING CIRCUITS AND MOBILE COMPUTING DEVICES INCLUDING THE SAME

(71) Applicant: Samsung Electronics Co., Ltd., Suwon-si, Gyeonggi-do (KR)

(72) Inventor: Won Ho Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 83 days.

(21) Appl. No.: 14/846,091

(22) Filed: Sep. 4, 2015

(65) Prior Publication Data

US 2016/0127665 A1 May 5, 2016

(30) Foreign Application Priority Data

Nov. 5, 2014 (KR) .................. 10-2014-0152944

(51) Int. Cl.
  *H04N 5/232* (2006.01)
  *H04N 5/235* (2006.01)
  *G06T 5/00* (2006.01)

(52) U.S. Cl.
  CPC ......... *H04N 5/23229* (2013.01); *G06T 5/002* (2013.01); *G06T 5/008* (2013.01); *G06T 2207/20208* (2013.01); *H04N 5/2355* (2013.01)

(58) Field of Classification Search
  CPC ............. H04N 5/23229; H04N 5/2355; H04N 5/3696; H04N 5/23212; H04N 2101/00; G06T 5/008; G06T 5/002; G06T 2207/20208; G06T 5/009; G06T 5/20; G06T 2207/20064; G06T 2207/10008; G06T 2207/20016; G06T 2207/10024; G02B 7/34; G03B 13/36; G03B 19/12; G06K 9/40
  See application file for complete search history.

(56) References Cited

U.S. PATENT DOCUMENTS

| | | | |
|---|---|---|---|
| 6,078,686 A | 6/2000 | Kim | |
| 7,116,838 B2 * | 10/2006 | Gindele | ................... G06K 9/40 358/1.2 |
| 7,869,656 B2 | 1/2011 | Kim | |
| 8,639,050 B2 | 1/2014 | Gupta et al. | |
| 8,766,999 B2 | 7/2014 | Lin | |
| 2003/0215153 A1 * | 11/2003 | Gindele | ................... G06K 9/40 382/254 |

(Continued)

FOREIGN PATENT DOCUMENTS

| | | |
|---|---|---|
| JP | 2007036844 A | 2/2007 |
| KR | 101164535 B1 | 7/2012 |

*Primary Examiner* — Roberto Velez
*Assistant Examiner* — Tuan Le
(74) *Attorney, Agent, or Firm* — Harness, Dickey & Pierce P.L.C.

(57) ABSTRACT

A local tone mapping circuit may include: a noise extractor configured to divide an image signal into a first noise signal and a noise-free signal; an intermediate tone mapping signal generator configured to calculate a tone mapping gain corresponding to the noise-free signal, and configured to generate an intermediate tone mapping signal by multiplying the noise-free signal by the tone mapping gain; and/or an adder configured to generate a final tone mapping signal by adding a second noise signal related with the first noise signal to the intermediate tone mapping signal.

16 Claims, 10 Drawing Sheets

(56) References Cited

U.S. PATENT DOCUMENTS

| | | | |
|---|---|---|---|
| 2005/0276502 A1* | 12/2005 | Brown Elliott | G06T 5/004 382/254 |
| 2006/0013503 A1 | 1/2006 | Kim | |
| 2006/0256215 A1* | 11/2006 | Zhang | H04N 5/3651 348/243 |
| 2007/0081721 A1* | 4/2007 | Xiao | G06T 5/009 382/167 |
| 2008/0085062 A1* | 4/2008 | Tsuruoka | H04N 1/4072 382/284 |
| 2009/0046943 A1* | 2/2009 | Ishiga | G06T 5/10 382/266 |
| 2009/0231460 A1* | 9/2009 | Wen | G06T 5/002 348/222.1 |
| 2009/0231467 A1* | 9/2009 | Yamashita | G03B 7/091 348/234 |
| 2010/0097503 A1* | 4/2010 | Aragaki | G02B 7/34 348/241 |
| 2010/0150465 A1* | 6/2010 | Lee | G06T 5/002 382/260 |
| 2010/0157078 A1* | 6/2010 | Atanassov | G06T 5/007 348/222.1 |
| 2010/0182462 A1* | 7/2010 | Utsugi | H04N 5/357 348/241 |
| 2013/0322753 A1 | 12/2013 | Lim et al. | |
| 2014/0064613 A1 | 3/2014 | Wu et al. | |
| 2014/0152686 A1 | 6/2014 | Narasimha et al. | |

* cited by examiner

LOCAL TONE MAPPING CIRCUITS AND MOBILE COMPUTING DEVICES INCLUDING THE SAME

CROSS-REFERENCE TO RELATED APPLICATION(S)

This application claims priority from Korean Patent Application No. 10-2014-0152944, filed on Nov. 5, 2014, in the Korean Intellectual Property Office (KIPO), the entire contents of which are incorporated herein by reference.

BACKGROUND

1. Field

Some example embodiments of the inventive concepts may relate generally to local tone mapping circuits. Some example embodiments of the inventive concepts may relate generally to local tone mapping circuits for reducing noise in signals that have been subjected to local tone mapping, by preventing noise in low-illumination regions of images from being boosted when the local tone mapping is performed on the low-illumination regions. Some example embodiments of the inventive concepts may relate generally to mobile computing devices including local tone mapping circuits.

2. Description of Related Art

High dynamic range (HDR) images may be images that contain various changes in grayscale (e.g., changes from darkest regions to brightest regions). HDR images may have large quantities of information and, thus, may require a dedicated viewer for HDR images. In order to watch HDR images using low dynamic range (LDR) displays which process 8-bit data, tone mapping processes may need to be performed.

Global tone mapping may include methods of using single tone mapping curves for entire image frames. These methods may use simple algorithms and may be easy to implement in real time. However, these methods may not adaptively reflect the local characteristics of images. On the contrary, local tone mapping may include methods of using different parameters in non-linear functions for each pixel. These methods well reflect local characteristics of images, thereby providing images having better rendering results than global tone mapping. In other words, local tone mapping may provide images having brightness with contrast improved based on local characteristics of the images.

However, when large tone mapping gain values are used to increase the brightness of low-illumination regions of images in local tone mapping, there may be problems in that noise in the low-illumination regions may also be boosted as the low-illumination regions are brightened.

SUMMARY

Some example embodiments of the inventive concepts may provide local tone mapping circuits.

Some example embodiments of the inventive concepts may provide local tone mapping circuits for reducing noise in signals that have been subjected to local tone mapping by preventing noise in low-illumination regions of images from being boosted when the local tone mapping is performed on the low-illumination regions.

Some example embodiments of the inventive concepts may provide mobile computing devices including local tone mapping circuits.

In some example embodiments, a local tone mapping circuit may comprise: a noise extractor configured to divide an image signal into a first noise signal and a noise-free signal; an intermediate tone mapping signal generator configured to calculate a tone mapping gain corresponding to the noise-free signal, and configured to generate an intermediate tone mapping signal based on the noise-free signal and the tone mapping gain; and/or an adder configured to generate a final tone mapping signal by adding a second noise signal related with the first noise signal to the intermediate tone mapping signal.

In some example embodiments, the first noise signal and the second noise signal may be the same as each other.

In some example embodiments, the noise extractor may comprise: a noise removal circuit configured to generate the noise-free signal from the image signal by removing noise from the image signal; and/or a first subtractor configured to generate the first noise signal by subtracting the noise-free signal from the image signal.

In some example embodiments, the first noise signal and the second noise signal may be different from each other and, when a noise gain is generated based on the noise-free signal, the second noise signal may be generated using the first noise signal and the noise gain.

In some example embodiments, when the first noise signal and the second noise signal are different from each other and a noise gain is generated based on the tone mapping gain, the second noise signal may be generated using the first noise signal and the noise gain.

In some example embodiments, the intermediate tone mapping signal generator may comprise: a tone mapping curve generator configured to generate a tone mapping curve for improving contrast in a local region of the noise-free signal using the noise-free signal; a tone mapping gain calculator configured to calculate the tone mapping gain for the noise-free signal using the tone mapping curve; and/or a multiplier configured to generate the intermediate tone mapping signal by multiplying the noise-free signal by the tone mapping gain.

In some example embodiments, the noise extractor may further comprise: a noise filter configured to filter the first noise signal using a spatial frequency, and configured to output a filtered first noise signal; and/or a second subtractor configured to generate a first noise band signal by subtracting the filtered first noise signal from the first noise signal.

In some example embodiments, the tone mapping curve generator may be further configured to generate a lookup table based on a luminance histogram of the noise-free signal, and may be further configured to generate the tone mapping curve using the lookup table.

In some example embodiments, the local tone mapping circuit may further comprise: a noise gain adjuster configured to generate a noise gain using the noise-free signal, and configured to generate the second noise signal by multiplying the first noise band signal by the noise gain.

In some example embodiments, the local tone mapping circuit may further comprise: a noise gain adjuster configured to generate a noise gain using the tone mapping gain, and configured to generate the second noise signal by multiplying the first noise band signal by the noise gain.

In some example embodiments, a local tone mapping circuit may comprise: a noise extractor configured to divide an image signal into a first noise signal and a noise-free signal; an intermediate tone mapping signal generator configured to calculate a tone mapping gain corresponding to the noise-free signal, and configured to generate an intermediate tone mapping signal based on the noise-free signal and the tone mapping gain; a noise gain adjuster configured to calculate a first noise gain and a second noise gain based on either of the noise-free signal and the tone mapping gain, configured to generate a second noise signal using the first noise signal and the first noise gain, and configured to generate a third noise signal using the first noise signal and the second noise gain; and/or an adder configured to generate a final tone mapping signal by adding the second noise signal and the third noise signal to the intermediate tone mapping signal.

In some example embodiments, the noise extractor may comprise: a noise removal circuit configured to generate the noise-free signal from the image signal by removing noise from the image signal; a first subtractor configured to generate the first noise signal by subtracting the noise-free signal from the image signal; a first noise filter configured to filter the first noise signal using a first spatial frequency, and configured to output a first filtered signal; a second noise filter configured to filter the first noise signal using a second spatial frequency, different from the first spatial frequency, and configured to output a second filtered signal; a second subtractor configured to generate a first noise band signal by subtracting the first filtered signal from the first noise signal; and/or a third subtractor configured to generate a second noise band signal by subtracting the second filtered signal from the first noise signal.

In some example embodiments, the noise gain adjuster may be further configured to generate the second noise signal by multiplying the first noise band signal by the first noise gain, and is further configured to generate the third noise signal by multiplying the second noise band signal by the second noise gain.

In some example embodiments, the intermediate tone mapping signal generator may comprise: a tone mapping curve generator configured to generate a tone mapping curve for improving contrast in a local region of the noise-free signal using the noise-free signal; a tone mapping gain calculator configured to calculate the tone mapping gain for the noise-free signal using the tone mapping curve; and/or a multiplier configured to generate the intermediate tone mapping signal by multiplying the noise-free signal by the tone mapping gain.

In some example embodiments, the tone mapping curve generator may be further configured to generate a lookup table based on a luminance histogram of the noise-free signal, and may be further configured to generate the tone mapping curve using the lookup table.

In some example embodiments, a local tone mapping circuit may comprise: a circuit configured to divide a first signal into a signal with noise and a signal with no noise, configured to calculate a gain corresponding to the signal with no noise, configured to generate a second signal based on the signal with no noise and the gain, and configured to generate a third signal by adding a second signal with noise, related with the signal with noise, to the second signal.

In some example embodiments, the signal with noise may be the same as the second signal with noise.

In some example embodiments, the signal with noise may be different from the second signal with noise.

In some example embodiments, the circuit may be further configured to filter the signal with noise.

In some example embodiments, the circuit may be further configured to filter the signal with noise using a plurality of different spatial frequencies.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
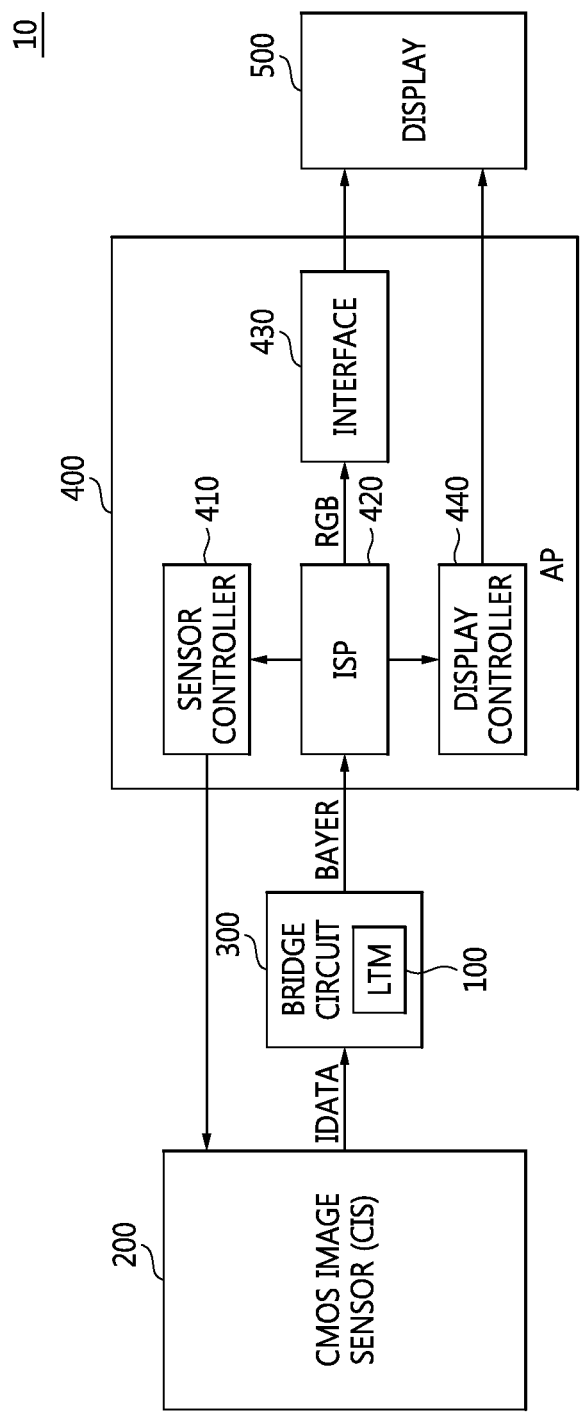
FIG. 1 is a block diagram of an image processing system according to some example embodiments of the inventive concepts.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram of an image processing system 10 according to some example embodiments of the inventive concepts. The image processing system 10 may be implemented as a personal computer (PC) or a mobile computing device. The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device.

The image processing system 10 may include a complementary metal-oxide semiconductor (CMOS) image sensor 200, a bridge circuit 300, an application processor (AP) 400, and a display 500. The bridge circuit 300 may include a local tone mapping (LTM) circuit 100 in some example embodiments (e.g., FIG. 1). The bridge circuit 300 may be implemented in an integrated circuit (IC) or a chip.

The LTM circuit 100 may perform tone mapping on each of pixels included in an image (or image data) using a pixel value of each pixel and pixel values of adjacent pixels so that a high-illumination region and a low-illumination region of the image are appropriately compensated, thereby generating an image with original local contrast preserved. Here, a pixel may be pixel data and may have a red, green, blue (RGB) data format, a first luminance, chrominance (YUV) data format, or a second luminance, chrominance (YCbCr) data format, but example embodiments of the inventive concepts are not restricted to these examples.

The LTM circuit 100 may be formed within the bridge circuit 300. The LTM circuit 100 may perform local tone mapping on image data IDATA output from the CMOS image sensor 200 and generate a tone-mapped signal. The structure and operation of the LTM circuit 100 will be described in detail with reference to FIGS. 4 through 6 later. The CMOS image sensor 200 may generate the image data IDATA of an object input or captured through an optical lens (not shown).

The bridge circuit 300 may receive the image data IDATA output from the CMOS image sensor 200, generate a Bayer pattern BAYER corresponding to the image data IDATA, and transmit the Bayer pattern BAYER to the AP 400. In other words, the bridge circuit 300 may function as a mediator between the CMOS image sensor 200 and the AP 400 by converting the image data IDATA output from the CMOS image sensor 200 into signals used in the AP 400.

The AP 400 may include a sensor controller 410, an image signal processor (ISP) 420, an interface 430, and a display controller 440. The AP 400 is an example of a processor and may be implemented as an IC, a system on chip (SoC), or a mobile AP.

The sensor controller 410 may generate various control signal for controlling the operations of the CMOS image sensor 200 and transmit the control signals to the CMOS image sensor 200 according to the control of the ISP 420.

The ISP 420 may process the Bayer pattern BAYER corresponding to the image data IDATA to generate RGB image data. In detail, the ISP 420 may process the Bayer pattern BAYER so that the image data IDATA can be displayed on the display 500 and may transmit processed image data to the interface 430. The ISP 420 and the CMOS image sensor 200 may be respectively implemented in chips in a single package (e.g., a multi-chip package (MCP)). Alternatively, the ISP 420 and the CMOS image sensor 200 may be implemented together in a single chip.

The ISP 420 may control the sensor controller 410, the interface 430, and the display controller 440. The interface 430 may transmit the image data processed by the ISP 420 to the display 500. The interface 430 may support a mobile industry processor interface (MIPI) protocol, an embedded DisplayPort (eDP) protocol, or a high definition multimedia interface (HDMI) protocol, but example embodiments of the inventive concepts are not restricted to these examples.

The display controller 440 may generate various control signals for controlling the display 500 according to the control of the ISP 420. The display 500 may display the image data received from the interface 430 in response to the control signals received from the display controller 440. The control signals may be transmitted to the display 500 through the interface 430. The display 500 may be a thin film transistor-liquid crystal display (TFT-LCD), a light emitting diode (LED) display, an organic LED (OLED) display, an active-matrix OLED (AMOLED) display, a flexible display, or a transparent display.

Figure 2:
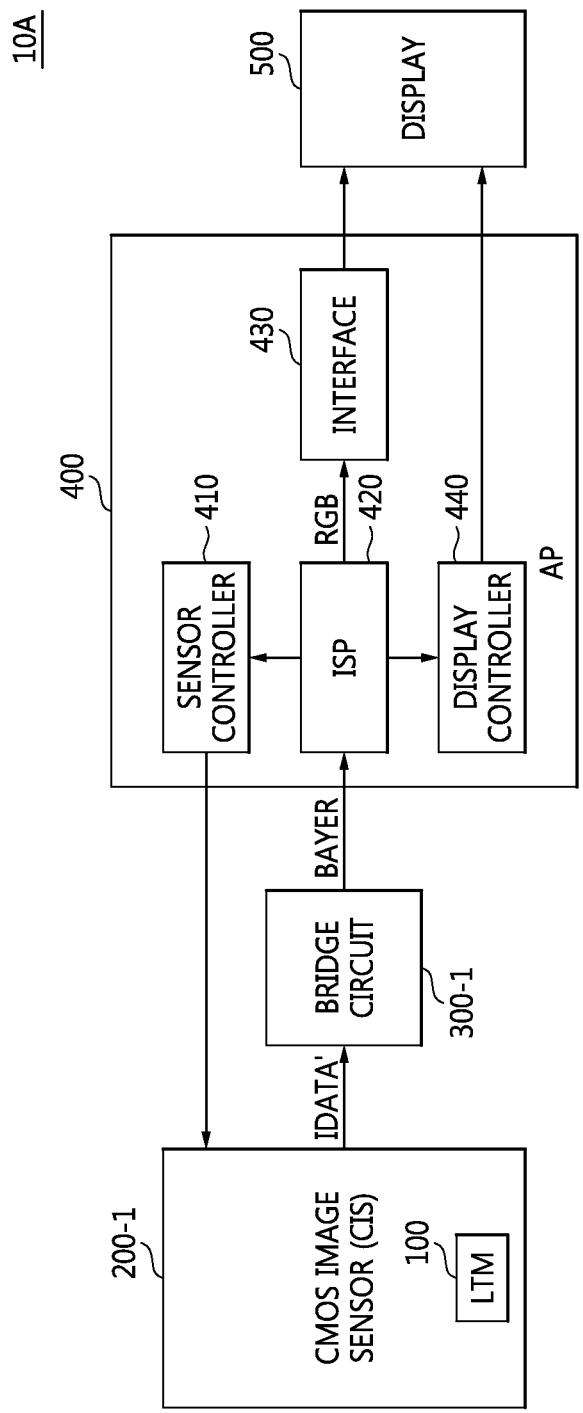
FIG. 2 is a block diagram of an image processing system according to some example embodiments of the inventive concepts.

FIG. 2 is a block diagram of an image processing system 10A according to some example embodiments of the inventive concepts. Referring to FIG. 2, the image processing system 10A may include the LTM circuit 100, a CMOS image sensor 200-1, a bridge circuit 300-1, the AP 400, and the display 500.

Apart from the fact that the LTM circuit 100 is formed within the CMOS image sensor 200-1 instead of the bridge circuit 300-1, the structure and operation of the image processing system 10A illustrated in FIG. 2 are substantially the same as or similar to those of the image processing system 10 illustrated in FIG. 1. The LTM circuit 100 included in the CMOS image sensor 200-1 may perform local tone Mapping on image data generated by the CMOS image sensor 200-1 to generate a tone-mapped signal IDATA'. The LTM circuit 100 may transmit the tone-mapped signal IDATA' to the bridge circuit 300-1.

Figure 3:
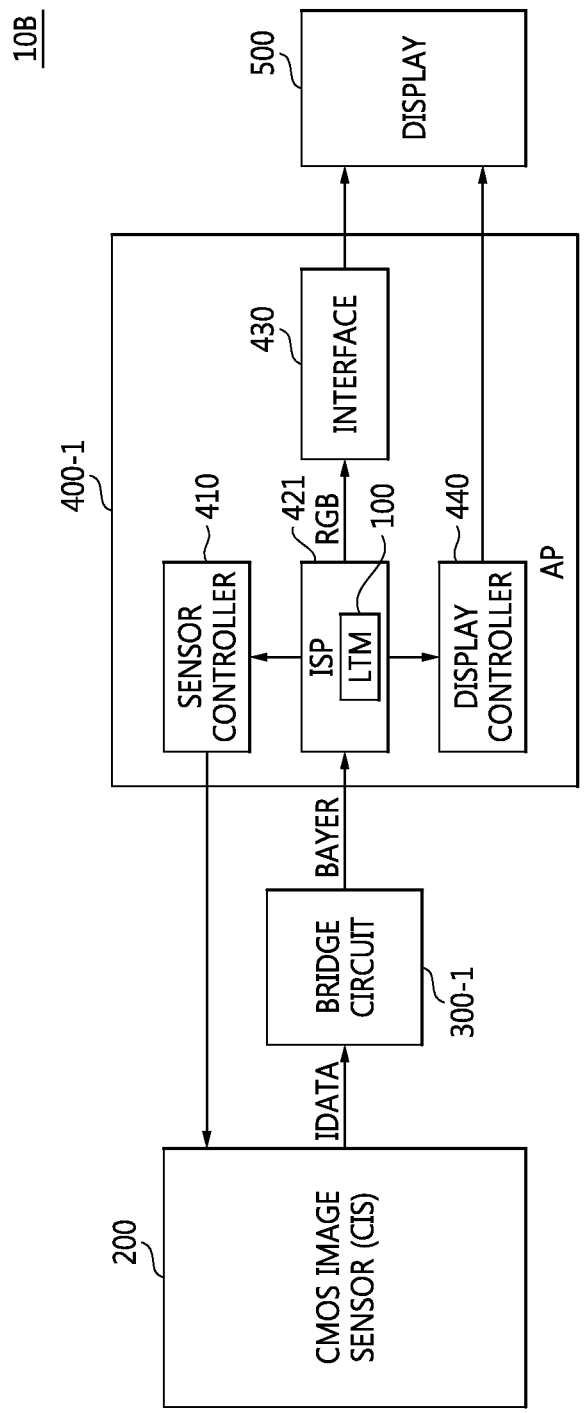
FIG. 3 is a block diagram of an image processing system according to some example embodiments of the inventive concepts.

FIG. 3 is a block diagram of an image processing system 10B according to some example embodiments of the inventive concepts. Referring to FIG. 3, the image processing system 10B may include the LTM circuit 100, the CMOS image sensor 200, the bridge circuit 300-1, an AP 400-1, and the display 500.

Apart from the fact that the LTM circuit 100 is formed within the AP 400-1 instead of the bridge circuit 300-1, the structure and operation of the image processing system 108 illustrated in FIG. 3 are substantially the same as or similar to those of the image processing system 10 illustrated in FIG. 1. The LTM circuit 100 included in an ISP 421 may perform local tone mapping while the ISP 421 is generating RGB image data from the Bayer pattern BAYER.

Figure 4:
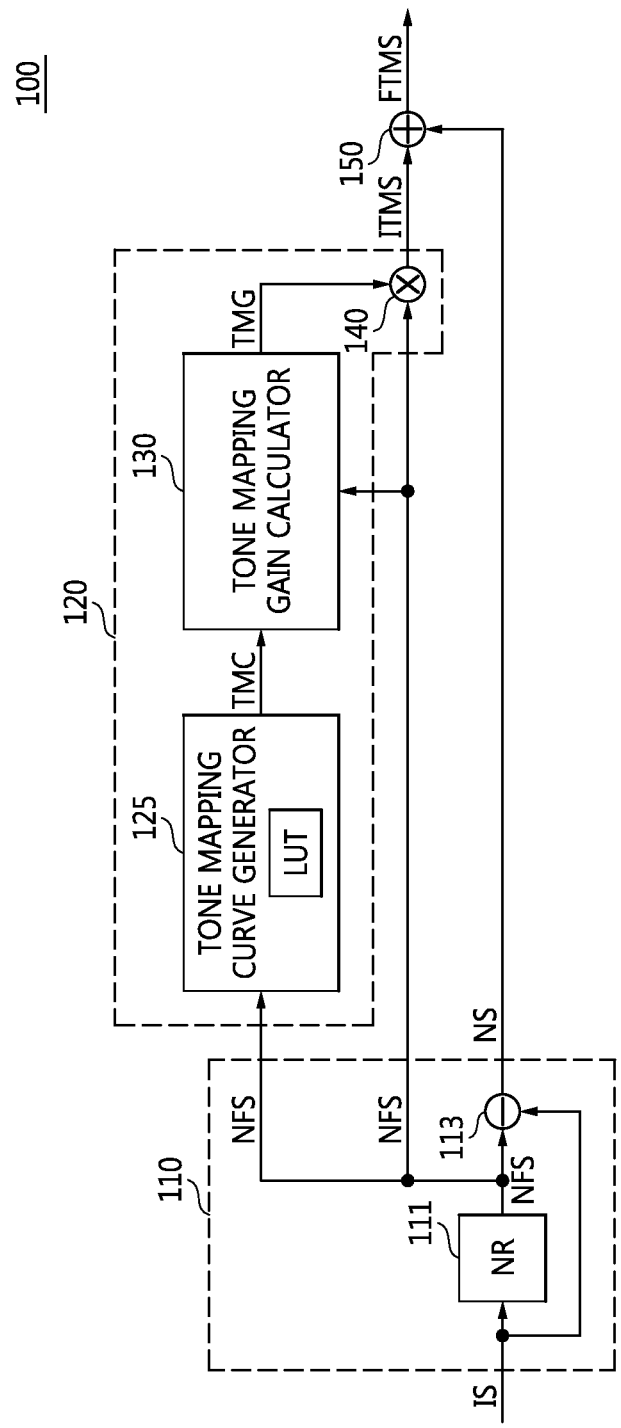
FIG. 4 is a block diagram of a local tone mapping circuit according to some example embodiments of the inventive concepts.

FIG. 4 is a block diagram of the LTM circuit 100 according to some example embodiments of the inventive concepts. The LTM circuit 100 may be included in the bridge circuit 300 illustrated in FIG. 1, the CMOS image sensor 200-1 illustrated in FIG. 2, or the ISP 421 illustrated in FIG. 3. The LTM circuit 100 may include a noise extractor 110, an intermediate tone mapping signal generator 120, and an adder 150.

The noise extractor 110 may divide an image signal IS into a first noise signal NS and a noise-free signal NFS. The image signal IS may be either a signal corresponding to (or related with) the image data IDATA generated by the CMOS image sensor 200 illustrated in FIG. 1, the CMOS image sensor 200-1 illustrated in FIG. 2, or a signal processed by the ISP 421 illustrated in FIG. 3.

The noise extractor 110 may include a noise removal circuit 111 and a first subtractor 113. The noise removal circuit 111 may remove noise from the image signal IS to generate the noise-free signal NFS. The first subtractor 113 may subtract the noise-free signal NFS from the image signal IS to generate the first noise signal NS.

The intermediate tone mapping signal generator 120 may calculate a tone mapping gain TMG corresponding to the noise-free signal NFS and may multiply the noise-free signal NFS by the tone mapping gain TMG, thereby generating an intermediate tone mapping signal ITMS. The intermediate tone mapping signal generator 120 may include a tone mapping curve generator 125, a tone mapping gain calculator 130, and a multiplier 140.

The tone mapping curve generator 125 may generate a tone mapping curve TMC for improving the contrast of a local region of the noise-free signal NFS using the noise-free signal NFS. In detail, the tone mapping curve generator 125 may generate a lookup table LUT based on the luminance histogram of the noise-free signal NFS and may generate the tone mapping curve TMC for improving the contrast of a local region of the noise-free signal NFS using the lookup table LUT. At this time, the luminance histogram may show the number of pixels for each brightness level.

The tone mapping gain calculator 130 may calculate the tone mapping gain TMG for the noise-free signal NFS using the tone mapping curve TMC generated by the tone mapping curve generator 125.

The multiplier 140 may multiply the noise-free signal NFS by the tone mapping gain TMG to generate the intermediate tone mapping signal ITMS. At this time, the intermediate tone mapping signal ITMS is a result of performing local tone mapping on the noise-free signal NFS, (e.g., a signal obtained by performing local tone mapping on a signal resulting from removing noise from the image signal IS).

The adder 150 may add a second noise signal related with the first noise signal NS to the intermediate tone mapping signal ITMS, thereby generating a final tone mapping signal FTMS. The second noise signal may be the same as the first noise signal NS. Alternatively, the second noise signal may be different from the first noise signal NS and may be generated using the first noise signal NS and noise gain.

The final tone mapping signal FTMS of FIG. 4 may be applied to one or more images. The final tone mapping signal FTMS may improve images, for example, by increasing the brightness, contrast, or brightness and contrast of the images with minimal increase in noise of the images. The final tone mapping signal FTMS may allow, for example, HDR images to be viewed on LDR displays. The viewed images may have, for example, increased brightness, contrast, or brightness and contrast with minimal increase in noise of the images.

Figure 5:
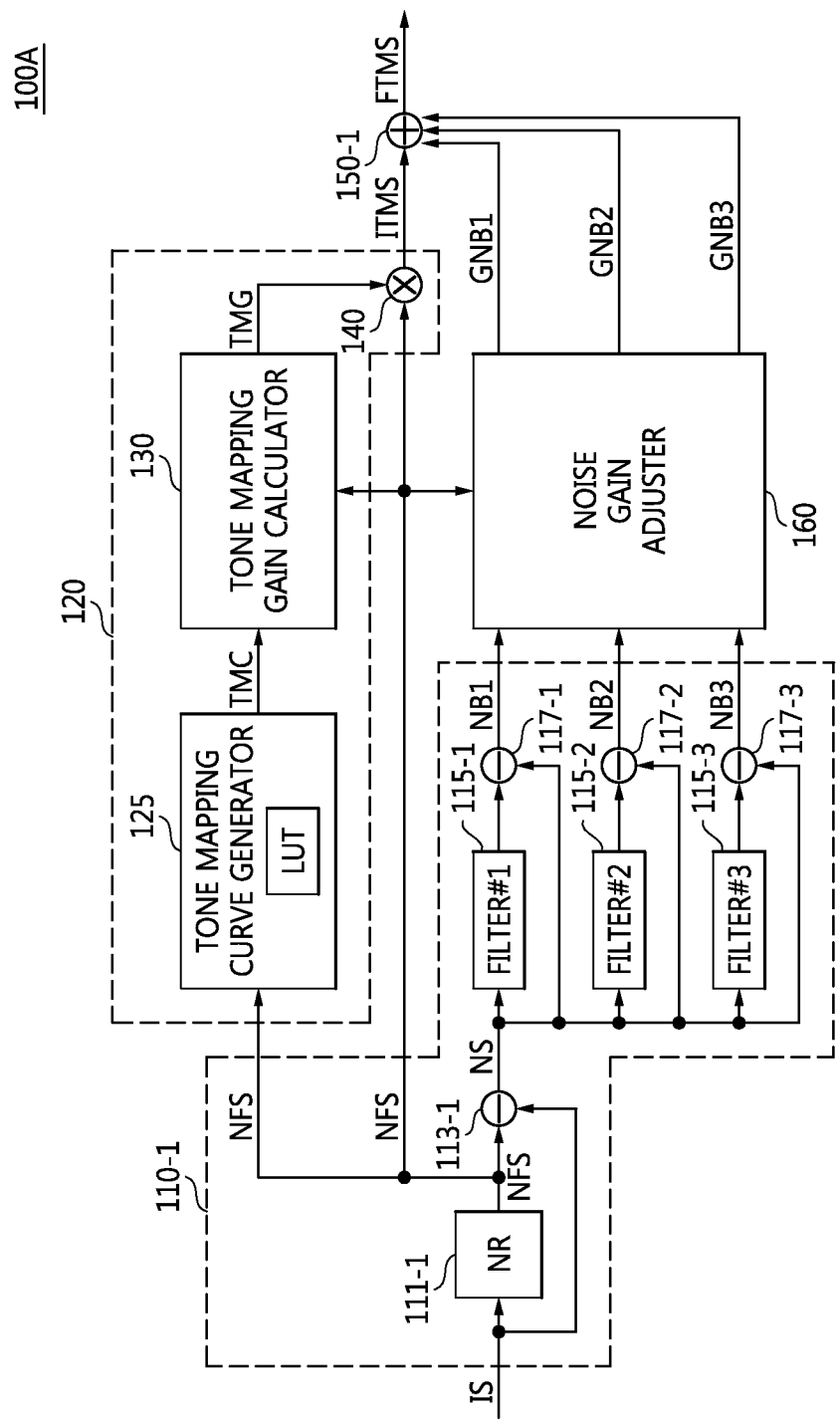
FIG. 5 is a block diagram of a local tone mapping circuit according to some example embodiments of the inventive concepts.

FIG. 5 is a block diagram of an LTM circuit 100A according to some example embodiments of the inventive concepts. The LTM circuit 100A may be included in the bridge circuit 300 illustrated in FIG. 1, the CMOS image sensor 200-1 illustrated in FIG. 2, or the ISP 421 illustrated in FIG. 3. The LTM circuit 100A may include a noise extractor 110-1, the intermediate tone mapping signal generator 120, an adder 150-1, and a noise gain adjuster 160. The LTM circuit 100A is an example of the LTM circuit 100 illustrated in FIG. 1.

The noise extractor 110-1 may divide the image signal IS into the first noise signal NS and the noise-free signal NFS. As described above, the image signal IS may be either a signal corresponding to (or related with) the image data IDATA generated by the CMOS image sensor 200 illustrated in FIG. 1, the CMOS image sensor 200-1 illustrated in FIG. 2, or a signal processed by the ISP 421 illustrated in FIG. 3.

The noise extractor 110-1 may include a noise removal circuit 111-1, a first subtractor 113-1, a plurality of noise filters 115-1, 115-2, and 115-3, and a plurality of subtractors 117-1, 117-2, and 117-3. The noise removal circuit 111-1 may remove noise from the image signal IS to generate the noise-free signal NFS. The first subtractor 113-1 may receive the noise-free signal NFS from the noise removal circuit 111-1 and may subtract the noise-free signal NFS from the image signal IS to generate the first noise signal NS.

The noise filters 115-1, 115-2, and 115-3 may receive the first noise signal NS from the first subtractor 113-1, may filter the first noise signal NS using different spatial frequencies, and may output filtered first noise signals to the subtractors 117-1, 117-2, and 117-3, respectively. The noise filters 115-1, 115-2, and 115-3 include the first noise filter 115-1, the second noise filter 115-2, and the third noise filter 115-3.

In detail, the first noise filter 115-1 may filter the first noise signal NS using a first spatial frequency, the second noise filter 115-2 may filter the first noise signal NS using a second spatial frequency, and the third noise filter 115-3 may filter the first noise signal NS using a third spatial frequency. The first through third spatial frequencies may be the same as or different from one another according to some example embodiments. Each of the noise filters 115-1, 115-2, and 115-3 may determine a pixel value of the first noise signal NS by performing filtering in a spatial domain using a particular mask (or kernel), thereby generating a filtered first noise signal.

Each of the noise filters 115-1, 115-2, and 115-3 may be a low pass filter having a kernel size of N×N (where N is a natural number), but example embodiments of the inventive concepts are not restricted to this example. Although three noise filters 115-1, 115-2, and 115-3 and three subtractors 117-1, 117-2, and 117-3 are included in the LTM circuit 100A in the example embodiments illustrated in FIG. 5, example embodiments of the inventive concepts are not restricted to the numbers of noise filters and subtractors included in the LTM circuit 100A.

The subtractors 117-1, 117-2, and 117-3 may receive the filtered first noise signals from the noise filters 115-1, 115-2, and 115-3, respectively; and may generate noise band signals NB1, NB2, and NB3, respectively, by subtracting the respective filtered first noise signals from the first noise signal NS. The subtractors 117-1, 117-2, and 117-3 may include the second subtractor 117-1, the third subtractor 117-2, and the fourth subtractor 117-3.

In detail, the second subtractor 117-1 may receive the first noise signal NS that has been filtered by the first noise filter 115-1 using a first frequency and subtract the filtered first noise signal from the first noise signal NS, thereby generating the first noise band signal NB1. The third subtractor 117-2 may receive the first noise signal NS that has been filtered by the second noise filter 115-2 using a second frequency and subtract the filtered first noise signal from the first noise signal NS, thereby generating the second noise band signal NB2. The fourth subtractor 117-3 may receive the first noise signal NS that has been filtered by the third noise filter 115-3 using a third frequency and subtract the filtered first noise signal from the first noise signal NS, thereby generating the third noise band signal NB3.

When the noise filters 115-1, 115-2, and 115-3 are low pass filters having a kernel size of N×N, the larger the kernel size, the wider the frequency domain of the noise band signals NB1, NB2, and NB3 respectively output from the subtractors 117-1, 117-2, and 117-3. For instance, when the first noise filter 115-1 is a low pass filter having a kernel size of 5×5 and the second noise filter 115-2 is a low pass filter having a kernel size of 3×3, the frequency domain of the first noise band signal NB1 may be wider than that of the second noise band signal NB2.

The intermediate tone mapping signal generator 120 may calculate the tone mapping gain TMG corresponding to the noise-free signal NFS and may multiply the noise-free signal NFS by the tone mapping gain TMG, thereby generating the intermediate tone mapping signal ITMS. The intermediate tone mapping signal generator 120 may include the tone mapping curve generator 125, the tone mapping gain calculator 130, and the multiplier 140.

The tone mapping curve generator 125 may generate the tone mapping curve TMC for improving the contrast of a local region of the noise-free signal NFS using the noise-free signal NFS. In detail, the tone mapping curve generator 125 may generate the lookup table LUT based on the luminance histogram of the noise-free signal NFS and may generate the tone mapping curve TMC for improving the contrast of a local region of the noise-free signal NFS using the lookup table LUT. At this time, the luminance histogram may show the number of pixels for each brightness level.

The tone mapping gain calculator 130 may calculate the tone mapping gain TMG for the noise-free signal NFS using the tone mapping curve TMC generated by the tone mapping curve generator 125.

The multiplier 140 may multiply the noise-free signal NFS by the tone mapping gain TMG to generate the intermediate tone mapping signal ITMS. At this time, the intermediate tone mapping signal ITMS is a result of performing local tone mapping on the noise-free signal NFS (e.g., a signal obtained by performing local tone mapping on a signal resulting from removing noise from the image signal IS).

The noise gain adjuster 160 may receive the noise-free signal NFS from the noise extractor 110-1 and the noise band signals NB1, NB2, and NB3 from the respective subtractors 117-1, 117-2, and 117-3. The noise gain adjuster 160 may calculate a noise gain for each of the noise band signals NB1, NB2, and NB3 based on the noise-free signal NFS; may multiply the noise band signals NB1, NB2, and NB3 by different noise gains, respectively; and may generate final noise signals GNB1, GNB2, and GNB3, as the multiplication results. At this time, each of the final noise signals GNB1, GNB2, and GNB3 may be a signal obtained by performing spatial filtering on the first noise signal NS and then adjusting the size of the result of the spatial filtering based on the brightness level of the noise-free signal NFS.

The final noise signals GNB1, GNB2, and GNB3 may include the first final noise signal GNB1, the second final noise signal GNB2, and the third final noise signal GNB3. The first final noise signal GNB1 may be generated by multiplying the first noise band signal NB1 by a first noise gain. The second final noise signal GNB2 may be generated by multiplying the second noise band signal NB2 by a second noise gain. The third final noise signal GNB3 may be generated by multiplying the third noise band signal NB3 by a third noise gain.

The adder 150-1 may add the first through third final noise signals GNB1, GNB2, and GNB3 to the intermediate tone mapping signal ITMS, thereby generating the final tone mapping signal FTMS.

The final tone mapping signal FTMS of FIG. 5 may be applied to one or more images. The final tone mapping signal FTMS may improve images, for example, by increasing the brightness, contrast, or brightness and contrast of the images with minimal increase in noise of the images. The final tone mapping signal FTMS may allow, for example, HDR images to be viewed on LDR displays. The viewed images may have, for example, increased brightness, contrast, or brightness and contrast with minimal increase in noise of the images.

Figure 6:
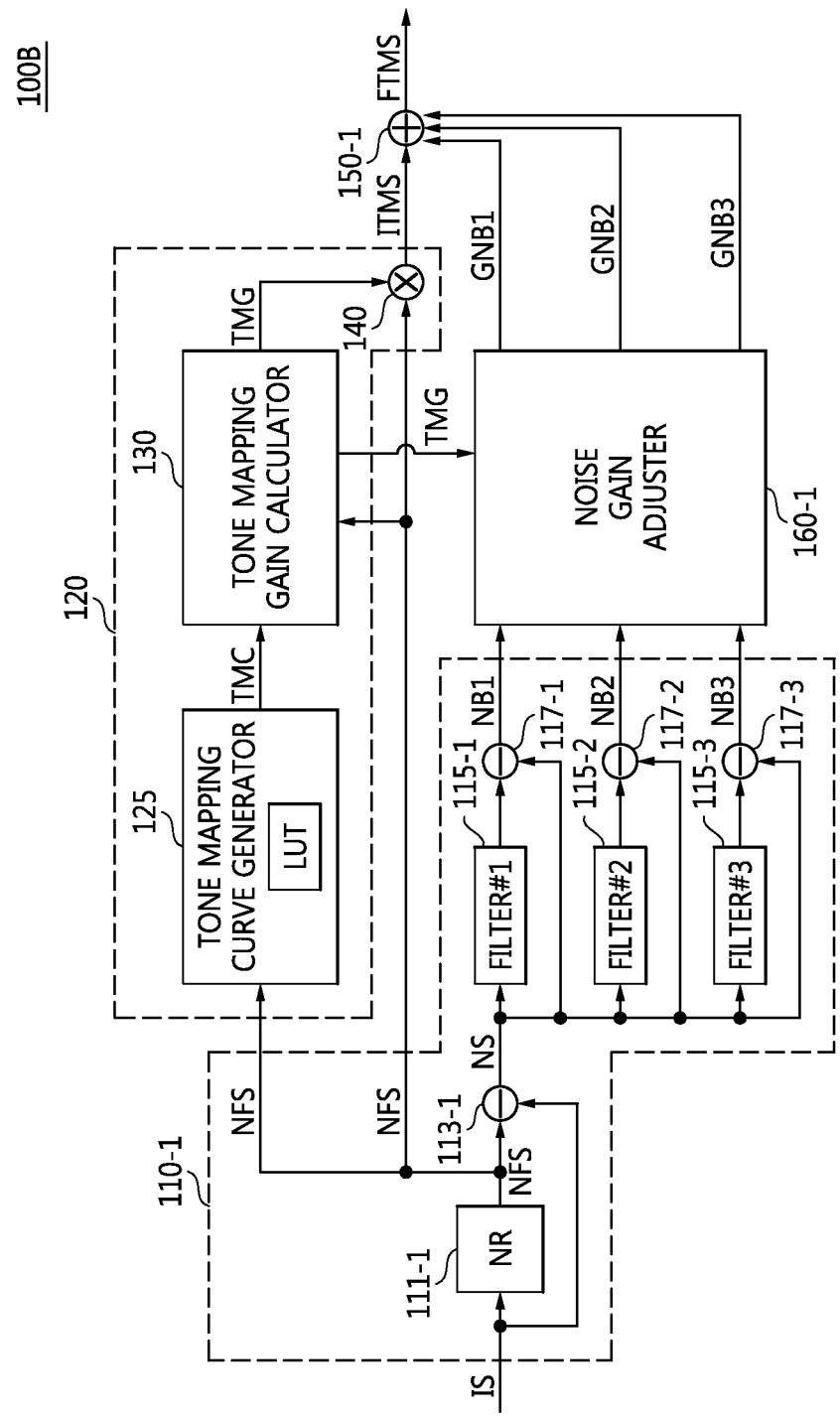
FIG. 6 is a block diagram of a local tone mapping circuit according to some example embodiments of the inventive concepts.

FIG. 6 is a block diagram of an LTM circuit 100B according to some example embodiments of the inventive concepts. The LTM circuit 100B may be included in the bridge circuit 300 illustrated in FIG. 1, the CMOS image sensor 200-1 illustrated in FIG. 2, or the ISP 421 illustrated in FIG. 3. The LTM circuit 100B may include the noise extractor 110-1, the intermediate tone mapping signal generator 120, the adder 150-1, and a noise gain adjuster 160-1. The LTM circuit 100B is another example of the LTM circuit 100 illustrated in FIG. 1.

Apart from the operation of the noise gain adjuster 160-1, the structure and operation of the LTM circuit 100B illustrated in FIG. 6 are substantially the same as or similar to those of the LTM circuit 100A illustrated in FIG. 5. The noise gain adjuster 160-1 may receive the tone mapping gain TMG from the tone mapping gain calculator 130, and the noise band signals NB1, NB2, and NB3 from the respective subtractors 117-1, 117-2, and 117-3.

The noise gain adjuster 160-1 may calculate a noise gain for each of the noise band signals NB1, NB2, and NB3 based on the tone mapping gain TMG; may multiply the noise band signals NB1, NB2, and NB3 by different noise gains, respectively; and may generate the final noise signals GNB1, GNB2, and GNB3. At this time, each of the final noise signals GNB1, GNB2, and GNB3 may be a signal obtained by performing spatial filtering on the first noise signal NS and then adjusting the size of the result of the spatial filtering based on the tone mapping gain TMG.

The final noise signals GNB1, GNB2, and GNB3 may include the first final noise signal GNB1, the second final noise signal GNB2, and the third final noise signal GNB3. The first final noise signal GNB1 may be generated by multiplying the first noise band signal NB1 by a first noise gain. The second final noise signal GNB2 may be generated by multiplying the second noise band signal NB2 by a second noise gain. The third final noise signal GNB3 may be generated by multiplying the third noise band signal NB3 by a third noise gain.

The final tone mapping signal FTMS of FIG. 6 may be applied to one or more images. The final tone mapping signal FTMS may improve images, for example, by increasing the brightness, contrast, or brightness and contrast of the images with minimal increase in noise of the images. The final tone mapping signal FTMS may allow, for example, HDR images to be viewed on LDR displays. The viewed images may have, for example, increased brightness, contrast, or brightness and contrast with minimal increase in noise of the images.

Figure 7:
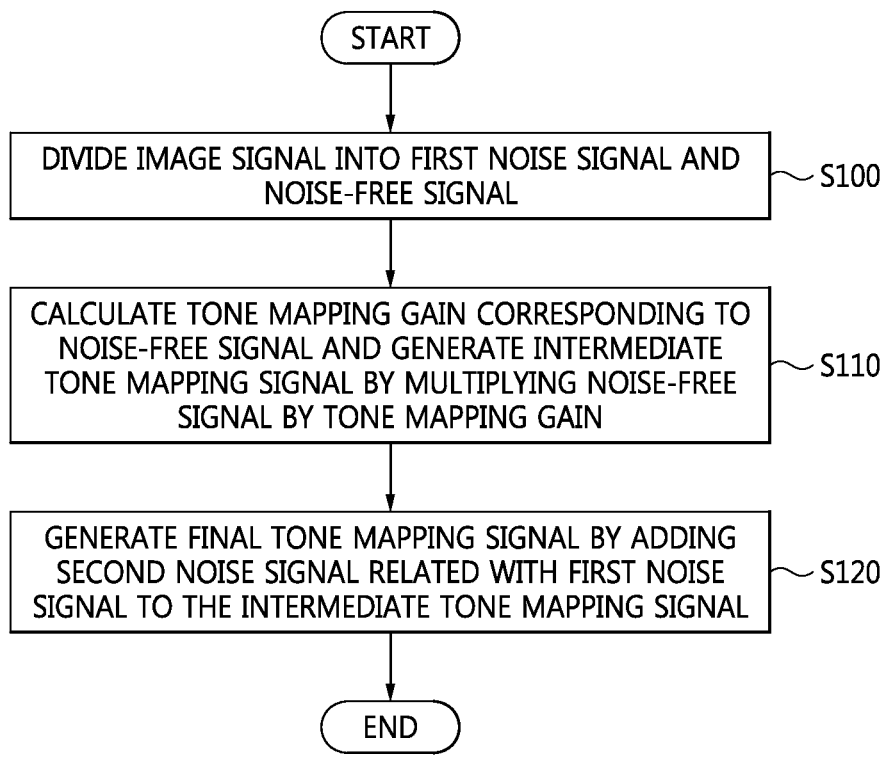
FIG. 7 is a flowchart of the operation of the local tone mapping circuit illustrated in FIG. 4 according to some example embodiments of the inventive concepts.

FIG. 7 is a flowchart of the operation of the LTM circuit 100 illustrated in FIG. 4 according to some example embodiments of the inventive concepts. Referring to FIGS. 4 and 7, the LTM circuit 100 may divide the image signal IS into the first noise signal NS and the noise-free signal NFS in operation S100.

The LTM circuit 100 may calculate the tone mapping gain TMG corresponding to the noise-free signal NFS and may generate the intermediate tone mapping signal ITMS by multiplying the noise-free signal NFS by the tone mapping gain TMG in operation S110. The LTM circuit 100 may generate the final tone mapping signal FTMS by adding a second noise signal related with the first noise signal NS to the intermediate tone mapping signal ITMS in operation S120. The second noise signal may be the same as the first noise signal NS. Alternatively, the second noise signal may be different from the first noise signal NS and may be generated by processing the first noise signal NS.

Figure 8:
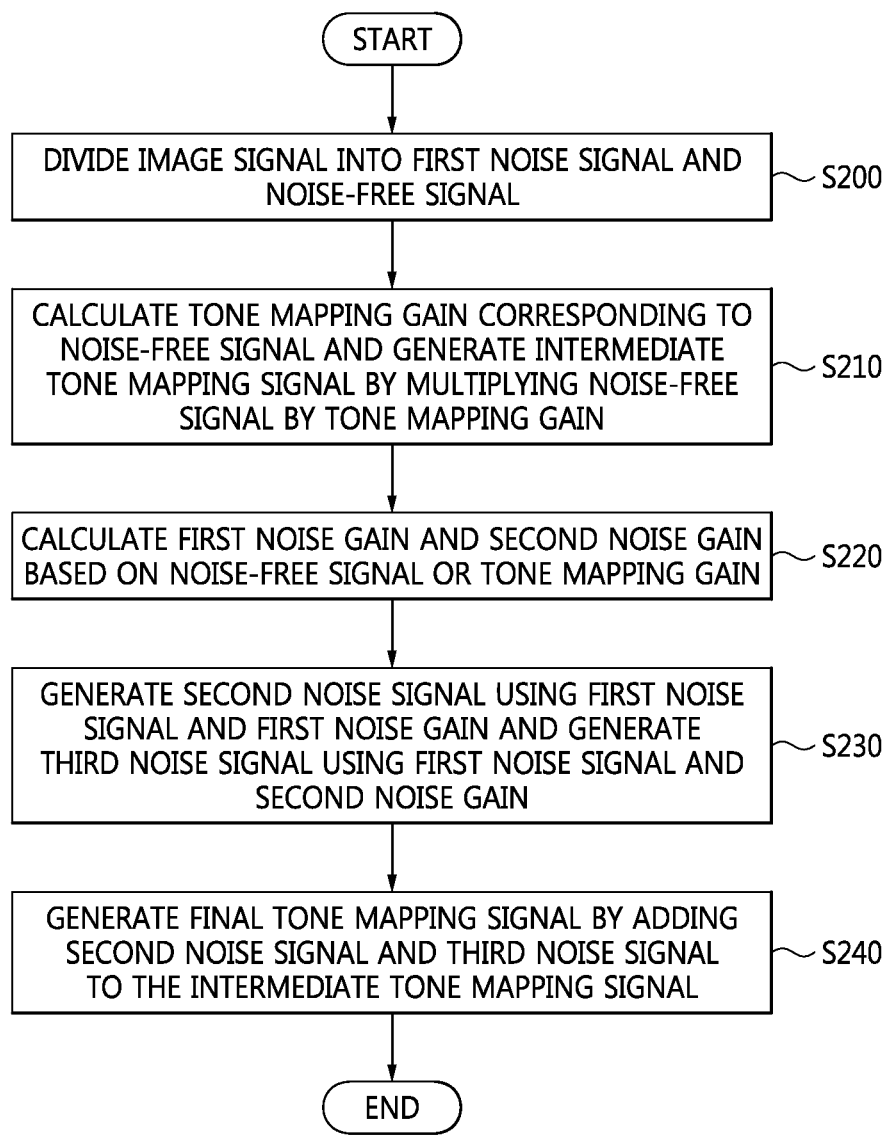
FIG. 8 is a flowchart of the operation of the local tone mapping circuit illustrated in FIG. 5 or 6 according to some example embodiments of the inventive concepts.

FIG. 8 is a flowchart of the operation of the LTM circuit 100A or 100B illustrated in FIG. 5 or 6 according to some example embodiments of the inventive concepts. Referring to FIGS. 5, 6, and 8, the LTM circuit 100A or 100B may divide the image signal IS into the first noise signal NS and the noise-free signal NFS in operation S200.

The LTM circuit 100A or 100B may calculate the tone mapping gain TMG corresponding to the noise-free signal NFS and may generate the intermediate tone mapping signal ITMS by multiplying the noise-free signal NFS by the tone mapping gain TMG in operation S210. The LTM circuit 100A or 100B may calculate a first noise gain and a second noise gain based on the noise-free signal NFS or the tone mapping gain TMG in operation S220.

The LTM circuit 100A or 100B may generate a second noise signal using the first noise signal NS and the first noise gain and generate a third noise signal using the first noise signal NS and the second noise gain in operation S230. The LTM circuit 100A or 100B may generate the final tone mapping signal FTMS by adding the second noise signal and the third noise signal to the intermediate tone mapping signal ITMS in operation S240.

Figure 9:
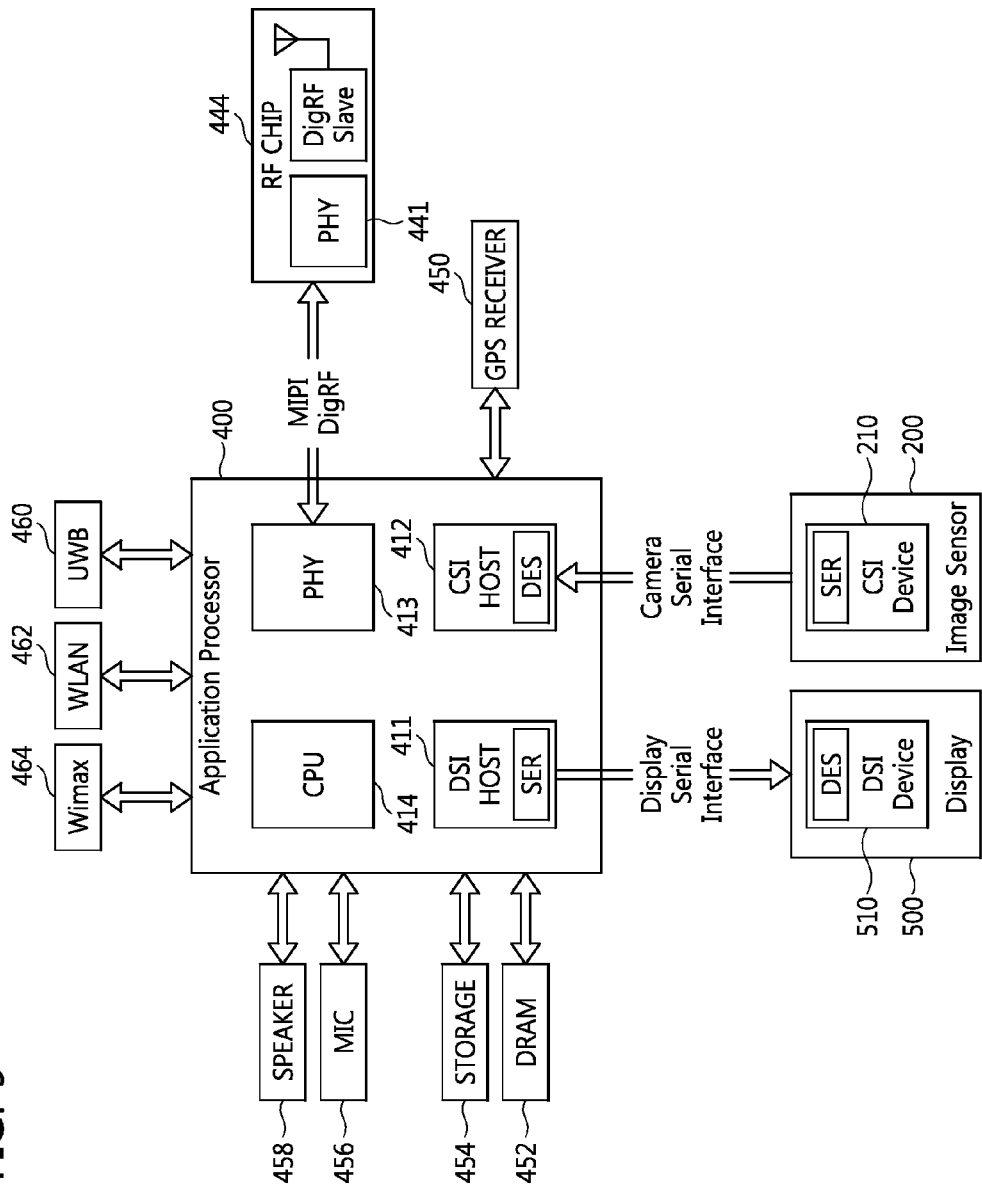
FIG. 9 is a block diagram of an image processing system according to some example embodiments of the inventive concepts.

FIG. 9 is a block diagram of an image processing system 20 according to some example embodiments of the inventive concepts. Referring to FIGS. 1 through 9, the image processing system 20 may use or support MIPI. The image processing system 20 may be implemented as a mobile computing device.

The image processing system 20 includes the CMOS image sensor 200, the AP 400, and the display 500. The LTM circuit 100, 100A, or 100B described with reference to FIGS. 1 through 8 may be formed within the CMOS image sensor 200 or the AP 400. The bridge circuit 300 or 300-1 described with reference to FIGS. 1 through 8 may be formed within the CMOS image sensor 200 or the AP 400.

A camera serial interface (CSI) host 412 in the AP 400 may perform serial communication with a CSI device 210 in the CMOS image sensor 200 through CSI. A deserializer DES and a serializer SER may be included in the CSI host 412 and the CSI device 210, respectively. The CMOS image sensor 200 may be one of the CMOS image sensors 200 and 200-1 described with reference to FIGS. 1 through 8.

A display serial interface (DSI) host 411 in the AP 400 may perform serial communication with a DSI device 510 in the display 500 through DSI. A serializer SER and a deserializer DES may be implemented in the DSI host 411 and the DSI device 510, respectively.

Image data (e.g., IDATA illustrated in FIG. 1) output from the CMOS image sensor 200 may be transmitted to the AP 400 using CSI. The AP 400 may process the image data and may transmit processed image data to the display 500 using DSI.

The image processing system 20 may also include a radio frequency (RF) chip 444 communicating with the AP 400. A physical layer (PHY) 413 of the AP 400 and a PHY 441 of the RF chip 444 may communicate data with each other according to MIPI DigRF (e.g., digital interface standard). A central processing unit (CPU) 414 included in the AP 400 may control the operations of the DSI host 411, the CSI host 412, and the PHY 413 and may include at least one core.

The AP 400 may be implemented in an IC or SoC. The AP 400 may be a processor or a host that can control the operation of the CMOS image sensor 200.

The image processing system 20 may further include a global positioning system (GPS) receiver 450, a volatile memory 452 like dynamic random access memory (DRAM), a data storage 454 formed with non-volatile memory like flash-based memory, a microphone (MIC) 456, and/or a speaker 458. The data storage 454 may be implemented as an external memory detachable from the AP 400. The data storage 454 may also be implemented as a universal flash storage (UFS), a multimedia card (MMC), an embedded MMC (eMMC), a universal serial bus (USB) flash driver, or a memory card. The image processing system 20 may communicate with external devices using at least one communication protocol or standard (e.g., ultra-wideband (UWB) 460, wireless local area network (WLAN) 462, worldwide interoperability for microwave access (WiMAX) 464, or long term evolution (LTETM) (not shown)). In some example embodiments, the image processing system 20 may also include a near field communication (NFC) module, a WiFi module (e.g., local area wireless computer networking technology), or a Bluetooth module.

Figure 10:
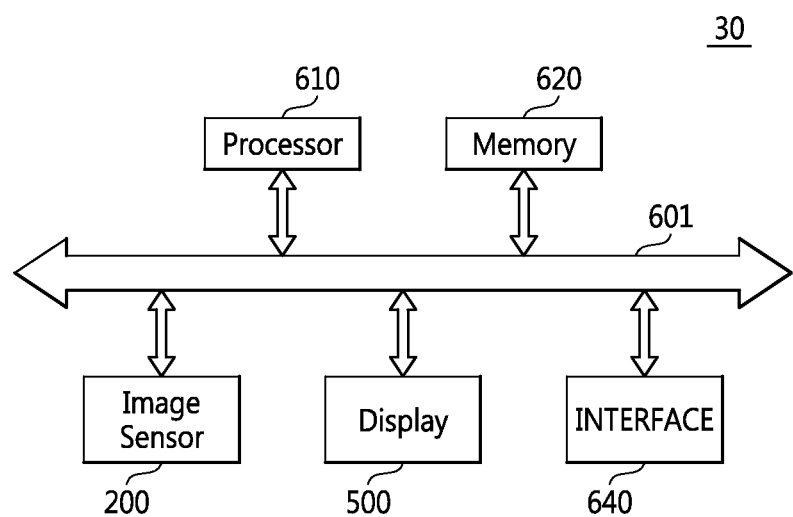
FIG. 10 is a block diagram of an image processing system according to some example embodiments of the inventive concepts.

FIG. 10 is a block diagram of an image processing system 30 according to some example embodiments of the inventive concepts. Referring to FIGS. 1 through 10, the image processing system 30 may include the CMOS image sensor 200, a bus 601, a processor 610, a memory 620, the display 500, and an interface 640.

The LTM circuit 100, 100A, or 100B described with reference to FIGS. 1 through 8 may be formed within the processor 610 or the CMOS image sensor 200. The bridge circuit 300 or 300-1 described with reference to FIGS. 1 through 8 may be formed within the processor 610 or the CMOS image sensor 200.

The processor 610 may control the operation of the CMOS image sensor 200. The processor 610 may process pixel signals output from the CMOS image sensor 200 and generate image data. The memory 620 may store a program for controlling the operation of the CMOS image sensor 200 and may store image data generated by the processor 610. The processor 610 may execute the program stored in the memory 620. The memory 620 may be formed as volatile or non-volatile memory.

The display 500 may display the image data output from the processor 610 or the memory 620. The interface 640 may be formed for the input and output of image data. The interface 640 may be implemented as a wired or wireless interface.

As described above, according to some example embodiments of the inventive concepts, an LTM circuit prevents noise in a low-illumination region of an image from being boosted when local tone mapping is performed on the low-illumination region, thereby reducing noise in a signal resulting from local tone mapping.

Algorithms for implementation or control of the local tone mapping circuits discussed in this application may be used for implementation or control of more general purpose apparatuses and/or methods of controlling apparatuses.

Methods for implementation or control of the local tone mapping circuits discussed in this application may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiments, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

While some example embodiments of the inventive concepts have been particularly shown and described with reference to some example embodiments thereof, it will be understood by those of ordinary skill in the art that various changes in forms and details may be made therein without departing from the spirit and scope of the inventive concepts as defined by the following claims.

It should be understood that example embodiments described herein should be considered in a descriptive sense only and not for purposes of limitation. Descriptions of features or aspects within example embodiments should typically be considered as available for other similar features or aspects in other example embodiments.

What is claimed is:

1. A local tone mapping circuit, comprising:
   a noise extractor configured to divide an image signal into a first noise signal and a noise-free signal;
   an intermediate tone mapping signal generator configured to calculate a tone mapping gain corresponding to the noise-free signal, and configured to generate an intermediate tone mapping signal based on the noise-free signal and the tone mapping gain; and
   an adder configured to generate a final tone mapping signal by adding a second noise signal related with the first noise signal to the intermediate tone mapping signal, wherein the first noise signal and the second noise signal are different from each other and, when a noise gain is generated based on the noise-free signal, the second noise signal is generated using the first noise signal and the noise gain.

2. The local tone mapping circuit of claim 1, wherein the noise extractor comprises:
   a noise removal circuit configured to generate the noise-free signal from the image signal by removing noise from the image signal; and
   a first subtractor configured to generate the first noise signal by subtracting the noise-free signal from the image signal.

3. The local tone mapping circuit of claim 2, wherein the noise extractor further comprises:
   a noise filter configured to filter the first noise signal using a spatial frequency, and configured to output a filtered first noise signal; and
   a second subtractor configured to generate a first noise band signal by subtracting the filtered first noise signal from the first noise signal.

4. The local tone mapping circuit of claim 3, further comprising:
   a noise gain adjuster configured to generate a noise gain using the noise-free signal, and configured to generate the second noise signal by multiplying the first noise band signal by the noise gain.

5. The local tone mapping circuit of claim 3, further comprising:
   a noise gain adjuster configured to generate a noise gain using the tone mapping gain, and configured to generate the second noise signal by multiplying the first noise band signal by the noise gain.

6. The local tone mapping circuit of claim 1, wherein when the first noise signal and the second noise signal are different from each other and a noise gain is generated based on the tone mapping gain, the second noise signal is generated using the first noise signal and the noise gain.

7. The local tone mapping circuit of claim 1, wherein the intermediate tone mapping signal generator comprises:
   a tone mapping curve generator configured to generate a tone mapping curve for improving contrast in a local region of the noise-free signal using the noise-free signal;
   a tone mapping gain calculator configured to calculate the tone mapping gain for the noise-free signal using the tone mapping curve; and
   a multiplier configured to generate the intermediate tone mapping signal by multiplying the noise-free signal by the tone mapping gain.

8. The local tone mapping circuit of claim 7, wherein the tone mapping curve generator is further configured to generate a lookup table based on a luminance histogram of the noise-free signal, and is further configured to generate the tone mapping curve using the lookup table.

9. A local tone mapping circuit, comprising:
   a noise extractor configured to divide an image signal into a first noise signal and a noise-free signal;
   an intermediate tone mapping signal generator configured to calculate a tone mapping gain corresponding to the noise-free signal, and configured to generate an intermediate tone mapping signal based on the noise-free signal and the tone mapping gain;
   a noise gain adjuster configured to calculate a first noise gain and a second noise gain based on either of the noise-free signal and the tone mapping gain, configured to generate a second noise signal using the first noise signal and the first noise gain, and configured to generate a third noise signal using the first noise signal and the second noise gain; and
   an adder configured to generate a final tone mapping signal by adding the second noise signal and the third noise signal to the intermediate tone mapping signal.

10. The local tone mapping circuit of claim 9, wherein the noise extractor comprises:
    a noise removal circuit configured to generate the noise-free signal from the image signal by removing noise from the image signal;
    a first subtractor configured to generate the first noise signal by subtracting the noise-free signal from the image signal;
    a first noise filter configured to filter the first noise signal using a first spatial frequency, and configured to output a first filtered signal;
    a second noise filter configured to filter the first noise signal using a second spatial frequency, different from the first spatial frequency, and configured to output a second filtered signal;
    a second subtractor configured to generate a first noise band signal by subtracting the first filtered signal from the first noise signal; and
    a third subtractor configured to generate a second noise band signal by subtracting the second filtered signal from the first noise signal.

11. The local tone mapping circuit of claim 10, wherein the noise gain adjuster is further configured to generate the second noise signal by multiplying the first noise band signal by the first noise gain, and is further configured to generate the third noise signal by multiplying the second noise band signal by the second noise gain.

12. The local tone mapping circuit of claim 9, wherein the intermediate tone mapping signal generator comprises:
    a tone mapping curve generator configured to generate a tone mapping curve for improving contrast in a local region of the noise-free signal using the noise-free signal;
    a tone mapping gain calculator configured to calculate the tone mapping gain for the noise-free signal using the tone mapping curve; and
    a multiplier configured to generate the intermediate tone mapping signal by multiplying the noise-free signal by the tone mapping gain.

13. The local tone mapping circuit of claim 12, wherein the tone mapping curve generator is further configured to generate a lookup table based on a luminance histogram of the noise-free signal, and is further configured to generate the tone mapping curve using the lookup table.

14. A local tone mapping circuit, comprising:
a circuit configured to divide a first signal into a signal with noise and a signal with no noise, configured to calculate a gain corresponding to the signal with no noise, configured to generate a second signal based on the signal with no noise and the gain, and configured to generate a third signal by adding a second signal with noise, related with the signal with noise, to the second signal, wherein the signal with noise and the second signal with noise are different from each other and, when a noise gain is generated based on the signal with no noise, the second signal with noise is generated using the signal with noise and the noise gain.

15. The circuit of claim 14, wherein the circuit is further configured to filter the signal with noise.

16. The circuit of claim 14, wherein the circuit is further configured to filter the signal with noise using a plurality of different spatial frequencies.

* * * * *